UNITED STATES PATENT OFFICE.

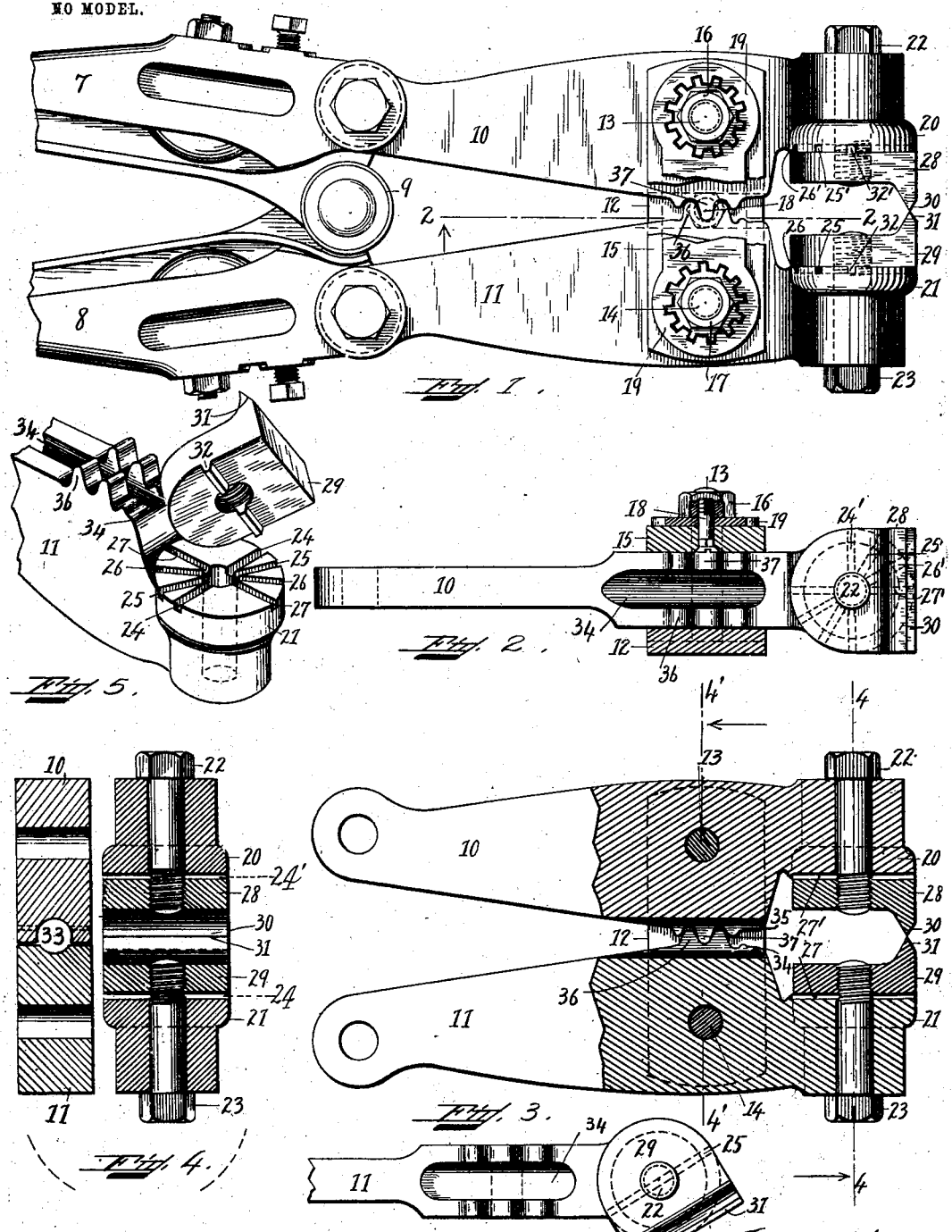

HENRY K. PORTER, OF CHELSEA, MASSACHUSETTS.

BOLT-CLIPPER.

SPECIFICATION forming part of Letters Patent No. 721,232, dated February 24, 1903.

Application filed September 12, 1902. Serial No. 123,059. (No model.)

*To all whom it may concern:*

Be it known that I, HENRY K. PORTER, a citizen of the United States, residing at Chelsea, in the county of Suffolk and State of Massachusetts, have invented a new and useful Improvement in Bolt-Clippers, of which the following is a specification.

My invention relates particularly to improvements in the bolt-clipper described in Letters Patent of the United States numbered 484,670, issued to me October 18, 1892; and the object of my present improvements is to provide a clipper having cutting-blades made separate from the gripping-jaws of the tool, but attachable thereto and made capable of adjustment, so as to cut in various positions and relations to the jaws which operate them, thus widening the range of usefulness of the tool, as will be described.

I attain the object stated by the mechanism illustrated in the accompanying drawings, in which—

Figure 1 is a side elevation of a clipper generally like that described in my said former patent, shown with the handles broken off to economize space, but with the jaws and cutters made to conform with my present improvement. Fig. 2 is a horizontal section on line 2 2, Fig. 1, and as viewed from below said line. Fig. 3 is a vertical section through the center of the clipper-head shown in Fig. 1. Fig. 4 embraces a vertical cross-section on line 4 4 and a like section through the jaws only on line 4' 4', Fig. 3, viewed from the left of said line. Fig. 5 is a perspective of a detached portion of the forward part of the under jaw and of the cutter attachable thereto; and Fig. 6 is a plan of the upper edge of the same, showing the cutter adjusted thereon in an oblique position.

Referring to the drawings, the tool, as illustrated, is comprised of a pair of right and left handles 7 and 8, pivoted together at their middle joint 9 and adjustably jointed, respectively, to the left jaw 10 and right jaw 11, the toothed jaws being interlocked and otherwise bound together by a bottom strap 12, bolts 13 and 14, top strap 15, lock-nuts 16 and 17, lock-plate bolt 18, and lock-plate 19. The parts named are substantially the same as those described in my said former patent except as to the construction of the jaw-levers, which in said patent were formed at their forward ends with integral cutting edges or blades, while in the present case they are enlarged in that part and formed with flat opposite faces or seats, to which separately-constructed cutters are attached and by which they are operated through proper movement of the handles. The flat surfaces or seats 20 and 21 thus formed on the lever-jaws are centrally drilled to receive bolts 22 and 23 for attaching the appropriately-formed cutters thereto. These jaw-seats are also grooved radially or diametrically partly around the central bolt-hole, as shown clearly at 24, 25, 26, and 27 in Fig. 5. The cutters 28 and 29 are appropriately formed to rest properly on said seats 20 and 21 and are centrally drilled and threaded and firmly held upon the jaws by the bolts 22 and 23, extended up to their heads through the jaws and threaded into the center of the cutters, as shown. Cutting edges 30 and 31 are formed on the cutter bodies or blocks, as shown, having a length of straight blade equal to the diameter of their circular bodies. Upon the under side of the cutter is formed a diametrical tongue 32, parallel with the cutting edge and adapted to be inserted in and to interlock with one of the diametrical grooves to help hold the blade in adjustment. The blades are shown in Fig. 1 as adjusted to cut on the extreme forward ends of the jaw-levers. In that case the tongue 32 on the cutter is in the appropriate groove, (marked 24 in Fig. 5.) By unscrewing the bolts 22 and 23 far enough to permit the tongues of their respective cutters to be withdrawn from the grooves and turned about the axis of the bolt, so as to be inserted, one in groove 25 and one in its corresponding groove 25' in the opposite jaw, then the cutters will be in the relative positions indicated by cutter 29 in Fig. 6 and when again secured by the bolts will cut obliquely to the axis of the jaws. If in like manner the cutter 29 should be adjusted and secured with its tongue in groove 27 and the opposite cutter with its tongue in the corresponding groove 27', then the clipper would cut on a line at right angles to the position of the cutters shown in Fig. 1 and in line with the axis of the jaws. Thus the cutters may be adjusted around their centers to cut at any desired angle to a line which will coincide with said section-line 2 2 in Fig. 1 within the range of a half-circle. By such capability of adjustment the single tool is made capable of clipping bolts under varying conditions which might require the use of several tools with non-adjustable blades, but of special construction as to the positions of their fixed blades. A longitudinal hole 33 is formed by opposing semicircular grooves 34 and 35, milled in the edges of the jaws and extending backward through the teeth 36 and 37 from the opening between the cutters to the opening caused by the divergence of the jaws. This hole 33 serves to permit the bolt-rod to pass more or less into or through the same as may be required in passing the blades over the ends of bolts and clipping various lengths.

It is obvious that such special constructions as above referred to might be made in the manner described employing only a single diametrical groove in each jaw arranged according to the required positions of the cutting-blades and not variable by adjustment therefrom.

In practice it quite frequently occurs that bolts to be clipped are so situated that they cannot be reached by the usual form of non-adjustable cutters, but might be readily clipped by cutters arranged across the outer ends of the jaws, as shown in Fig. 1, and others by cutters arranged obliquely, as illustrated in Fig. 6. Hence the convenience and usefulness of the tool are greatly enlarged by the improvement now described. When the tool is practically used, it is held by the handles, which are moved to and from each other within the fixed limits of their movement, and the action of the jaws resulting therefrom is so well understood that further description in that respect is deemed unnecessary. The lever-jaws thus enlarged and formed with flat opposite surfaces with sufficient clear space between adapts them to serve very conveniently and effectively for various forms of cutting attachments, and forming part, as they do, of the described system of compound levers they constitute very powerful means for operating such attachments.

It is obvious that the cutting-blades or bits may be either permanently or adjustably secured to the jaw-levers in a variety of ways other than the tongues and grooves shown, as by pins and holes or a larger number of fine radial interlocking teeth formed on the lever-jaw and cutter; but such means are but mechanical equivalents, and while the radial or diametrical grooves in the lever-jaw and the single tongue on the cutter are believed to be the best and most practical method of accomplishing the desired result I do not wish to confine myself strictly to this method.

I claim—

1. In a bolt-clipper of the character described, the combination of a pair of lever-jaws and a pair of cutting-blades, the latter being detachably secured to, made adjustable on, and operated by, the jaws, so as to cut in various positions, substantially as specified.

2. In a bolt-clipper, the combination of a pair of lever-jaws formed with opposite flat faces, or circular seats, having one or more diametrical, or radial, grooves therein; a pair of cutters adapted to be adjustably attached to the jaws, and to interlock with the grooves therein; and a pair of fastening-bolts extended through the jaws and threaded into the cutters; all substantially as specified.

3. The combination of a pair of handles pivoted together; with a pair of levers adjustably connected with the handles, and pivotally clamped between straps extended across their opposite sides, and bolted together through the levers and securely fastened; and having interlocked teeth on their adjacent and longitudinally-grooved edges, and formed with enlarged front ends, having opposite flat surfaces, adapted to serve as operative jaws for various attachments, all substantially as specified.

4. The combination of handles 7 and 8, pivoted together; lever-jaws 10 and 11, adjustably connected with the handles, and formed with edge grooves and interlocking teeth, and provided with grooved seats 20 and 21; cutters 28 and 29; bolts 22 and 23, by which the cutters are attached to the jaws; strap 12 extended across one side of the levers; pivot-bolts 13 and 14 extended from strap 12 through the jaws and opposite plates; strap 15 extended across the jaws opposite strap 12; toothed lock-nuts threaded on the pivot-bolts; lock-plate 19; and lock-plate bolt 18; all substantially as specified.

HENRY K. PORTER.

Witnesses:
EUGENE HUMPHREY,
EDWARD E. SHERMAN.